Patented Oct. 4, 1932

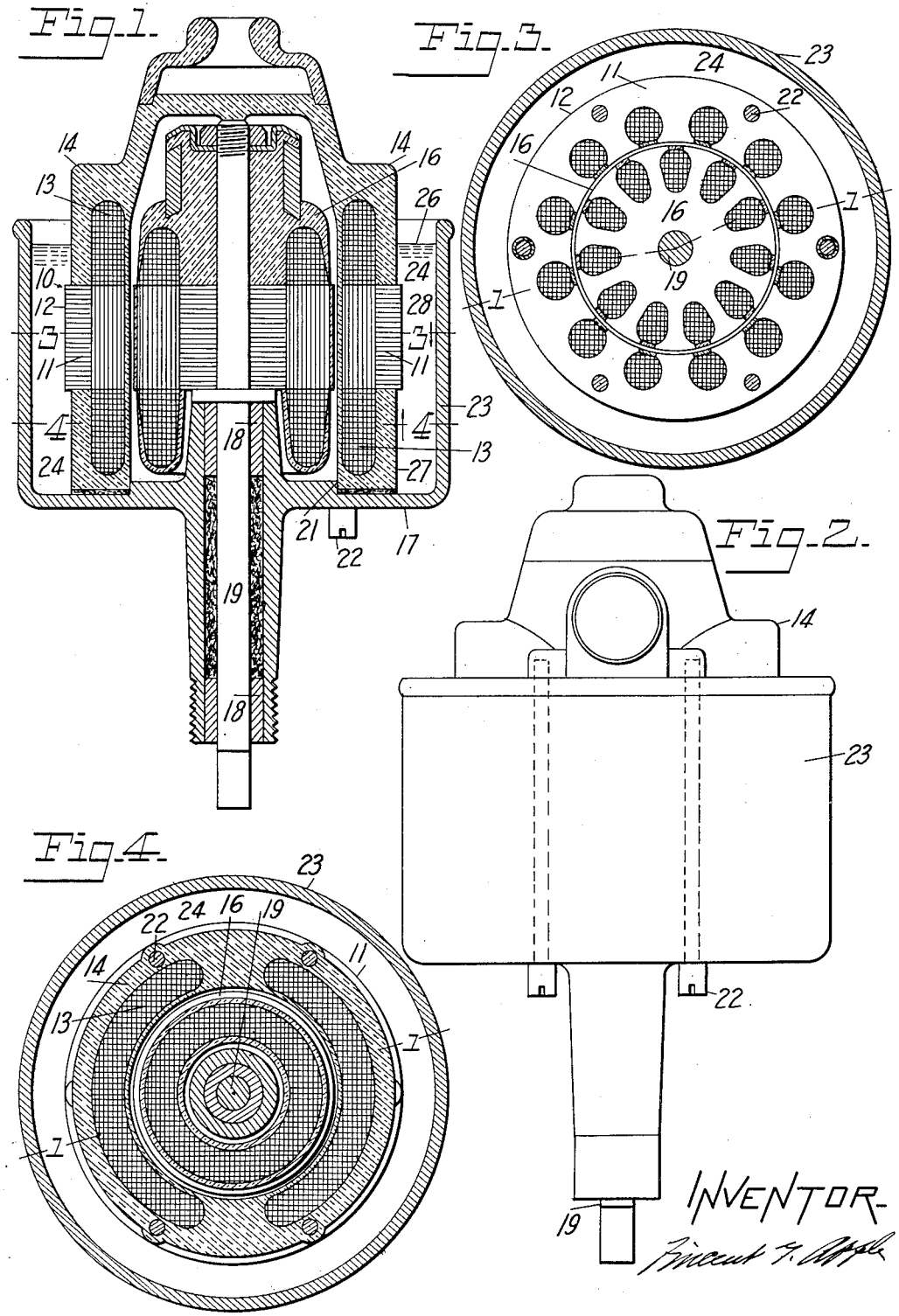

1,881,343

UNITED STATES PATENT OFFICE

VINCENT G. APPLE, OF DAYTON, OHIO

DYNAMO ELECTRIC MACHINE WITH IMPROVED COOLING MEANS

Application filed April 11, 1930. Serial No. 443,367.

This invention relates to dynamo electric machines and particularly to such as operate at unusually high temperature.

The object of the invention is to provide a dynamo electric machine wherein the housing may be completely closed, but which, by a novel construction, combines means to rapidly transfer the heat from within the enclosed structure to the outside with means to absorb the heat so transferred.

Another object is to provide means to protect a user of the machine from accidental contact with the heated surfaces.

These and other objects are attained by the structure hereinafter described, reference being had to the accompanying drawing, wherein—

Fig. 1 is a vertical axial section, taken at 1—1 of Figs. 3 and 4, through a motor embodying my invention.

Fig. 2 is an elevation of the motor.

Figs. 3 and 4 are transverse sections taken at 3—3 and 4—4 respectively of Fig. 1.

Similar numerals refer to similar parts throughout the several views.

The field element 10 comprises a magnetizable core 11, composed of laminæ 12, field coils 13 and a mass 14 of insulation molded to the core and extending through and about the coils filling the minute spaces between the individual turns thereof to insulate them one from the other, cementing the turns to each other and to the core and forming a hollow housing within which an armature may revolve.

The insulation composing the housing is preferably of a cementitious nature, and of a kind having as high thermal conductivity as may be had, so that the mass of insulation not only serves as a housing but provides a substantially continuous heat conducting path from the innermost turns of the winding in which the heat is generated to the cooler surfaces of the housing, and, because of the intimate union between the insulation and the core, heat is rapidly conducted from the coils to the core and through the core to the outer cooler surfaces thereof.

In order that the armature 16 may be entered into the housing one end is necessarily left open, and after the armature is entered this end is closed by the bearing head 17 which carries the bearing bushings 18 within which the armature shaft 19 rotates.

The head 17 extends into the armature opening as at 21 to maintain concentric relation between the armature 16 and the field element 10 and screws 22 secure the head to the field element making a water-tight seal therebetween.

Integrally extending from the outer edge of head 17 is a cup 23, the bottom of which is the head itself. Cup 23 extends completely around field element 10 leaving the space 24 between.

In operation the space 24 is kept filled with a suitable liquid coolant 26, preferably of a kind which will not evaporate materially from the heat of the motor. Heat generated within the coils is rapidly transferred through the continuous path of heat conducting insulation to the surfaces 27 of the housing and to the laminæ 12 and through them to the surfaces 28 of the core, where it is rapidly absorbed by the coolant 26. Under these conditions the outer surfaces of the cup 23 is never so hot as to produce injury if accidentally touched by the hand.

Having described an embodiment of my invention, I claim,

The combination in a dynamo electric machine of a magnetizable core, coils on said core, a mass of cementitious insulation of high thermal conductivity penetrating and filling the interstices of said coils surrounding them, cementing them to said core and forming a hollow housing open at one end, a head secured to said open end to form a liquid tight seal for said hollow housing, said head being somewhat larger than said housing, and integral sides extending upwardly from the periphery of said head leaving a space around said housing adapted to contain a liquid coolant.

In testimony whereof I affix my signature.

VINCENT G. APPLE.